(12) United States Patent
Hosoi (10) Patent No.: US 11,936,297 B2
(45) Date of Patent: Mar. 19, 2024

(54) DC-DC CONVERTER INCLUDING FIRST AND SECOND COILS MAGNETICALLY COUPLED SUCH THAT CURRENT FLOWS THROUGH SECOND COIL IN FORWARD DIRECTION OF DIODE BY MUTUAL INDUCTION AS CURRENT FLOWING THROUGH FIRST COIL FROM INTERMEDIATE TERMINAL TO OUTPUT TERMINAL INCREASES AND VEHICLE

(71) Applicant: Panasonic Intellectual Property Management Co., Ltd., Osaka (JP)

(72) Inventor: Hiroyuki Hosoi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 129 days.

(21) Appl. No.: 17/586,295

(22) Filed: Jan. 27, 2022

(65) Prior Publication Data

US 2022/0294345 A1    Sep. 15, 2022

(30) Foreign Application Priority Data

Mar. 10, 2021 (JP) ................................ 2021-038750

(51) Int. Cl.
*H02M 3/158* (2006.01)
*H02M 1/34* (2007.01)

(52) U.S. Cl.
CPC ........... *H02M 3/158* (2013.01); *H02M 1/342* (2021.05)

(58) Field of Classification Search
CPC ............................. H02M 1/342; H02M 3/158
See application file for complete search history.

(56) References Cited

U.S. PATENT DOCUMENTS

| 2006/0226816 A1* | 10/2006 | Wai | H02M 1/34 |
| | | | 323/222 |
| 2008/0037295 A1* | 2/2008 | Suzuki | H02M 1/32 |
| | | | 361/93.7 |
| 2015/0102765 A1* | 4/2015 | Lee | H02M 3/33573 |
| | | | 363/17 |

(Continued)

FOREIGN PATENT DOCUMENTS

| DE | 102013225507 A1 * | 4/2015 | ............ H02J 7/0052 |
| EP | 3163735 A1 * | 5/2017 | ........ H02M 3/33507 |

(Continued)

*Primary Examiner* — Sisay G Tiku
(74) *Attorney, Agent, or Firm* — Seed IP Law Group LLP (57) ABSTRACT

A DC-DC converter outputs a DC output voltage between first and second output terminals, and includes: a conversion circuit that outputs an intermediate voltage obtained by performing power conversion on an input voltage, between first and second intermediate terminals; a first coil provided between the first intermediate terminal and the first output terminal; and a diode provided in series with a second coil. A DC voltage is applied to the second coil and the diode, with a polarity in a direction in which a reverse bias is applied to the diode. The first coil and the second coil are magnetically coupled such that a current is made flow through the second coil in a forward direction of the diode by mutual induction as a current flowing through the first coil in a direction from the first intermediate terminal to the first output terminal increases.

15 Claims, 6 Drawing Sheets (56) References Cited

U.S. PATENT DOCUMENTS

| | | | | |
|---|---|---|---|---|
| 2016/0001665 | A1* | 1/2016 | Kim | H02M 3/01 363/21.02 |
| 2019/0149042 | A1* | 5/2019 | Haneda | H02M 3/33538 323/282 |
| 2022/0263418 | A1* | 8/2022 | Hosoi | H02M 3/33592 |

FOREIGN PATENT DOCUMENTS

| | | | | |
|---|---|---|---|---|
| JP | H10285915 | A * | 10/1998 | |
| JP | 2006-211878 | A | 8/2006 | |
| JP | 2006211877 | A * | 8/2006 | |
| JP | 2006211878 | A * | 8/2006 | |
| JP | 2006211880 | A * | 8/2006 | |
| JP | 4231767 | B2 | 12/2008 | |
| JP | 5687373 | B1 | 1/2015 | |
| JP | 2015070716 | A * | 4/2015 | |
| JP | 2017221073 | A * | 12/2017 | H01F 27/306 |
| JP | 6512064 | B2 * | 5/2019 | H02M 3/33507 |
| TW | I238589 | B * | 8/2005 | |
| WO | WO-2013076752 | A1 * | 5/2013 | H02M 1/34 |
| WO | WO-2018012025 | A1 * | 1/2018 | F02P 23/04 |

* cited by examiner

DC-DC CONVERTER INCLUDING FIRST AND SECOND COILS MAGNETICALLY COUPLED SUCH THAT CURRENT FLOWS THROUGH SECOND COIL IN FORWARD DIRECTION OF DIODE BY MUTUAL INDUCTION AS CURRENT FLOWING THROUGH FIRST COIL FROM INTERMEDIATE TERMINAL TO OUTPUT TERMINAL INCREASES AND VEHICLE

CROSS-REFERENCE TO RELATED APPLICATIONS

This application is based upon and claims the benefit of priority from Japanese Patent Application No. 2021-038750, filed on Mar. 10, 2021, the entire contents of which are incorporated herein by reference.

FIELD

The present disclosure relates to a DC-DC converter and a vehicle.

BACKGROUND

Insulated-type DC-DC converters that use transformers are known. Such DC-DC converters are used, for example, in onboard chargers that charge lead-acid batteries with the power held by onboard lithium-ion batteries. For example, the DC-DC converter used in an onboard charger converts a DC voltage of on the order of 360 V generated by a lithium-ion battery into a DC voltage of on the order of 14 V for charging power to a lead-acid battery.

In addition, DC-DC converters sometimes generate a surge voltage internally due to the effects of transformer leakage inductance or parasitic inductance, or the like. The DC-DC converter is equipped with a snubber circuit that prevents such a surge voltage from being equal to or greater than a predetermined voltage. DC-DC converters can be configured using inexpensive metal oxide semiconductor field effect transistors (MOSFETs) or the like with low breakdown voltages because the provision of a snubber circuit ensures that internal voltages above a predetermined voltage are not generated. Japanese Patent No. 4231767 discloses a DC-DC converter that has a snubber circuit.

Incidentally, a DC-DC converter is typically equipped with an RCD snubber circuit that is configured from a resistor, a capacitor, and a diode. The RCD snubber circuit uses a resistor to consume the power suppressed by the clamp. Hence, DC-DC converters equipped with an RCD snubber circuit have poor power conversion efficiency due to the loss of power consumed by the RCD snubber circuit.

An object of the present disclosure is to provide a DC-DC converter and a vehicle that efficiently suppress a surge voltage.

SUMMARY

A DC-DC converter according to the present disclosure outputs a DC output voltage between a first output terminal and a second output terminal by performing power conversion on a DC input voltage. The DC-DC converter includes a conversion circuit, a first coil, a second coil, and a diode. The conversion circuit outputs an intermediate voltage which is obtained by performing power conversion on the input voltage, between a first intermediate terminal and a second intermediate terminal. The first coil is provided between the first intermediate terminal and the first output terminal. The diode is provided in series with the second coil. A DC voltage is applied to the second coil and the diode provided in series. The DC voltage is applied to the second coil and the diode provided in series, with a polarity in a direction in which a reverse bias is applied to the diode. The first coil and the second coil are magnetically coupled such that a current is made flow through the second coil in a forward direction of the diode by mutual induction as a current flowing through the first coil in a direction from the first intermediate terminal to the first output terminal increases.

Further, a vehicle according to the present disclosure includes the DC-DC converter.

DETAILED DESCRIPTION

An embodiment of a DC-DC converter 10 according to the present disclosure will be described hereinbelow with reference to the drawings.

Figure 1:
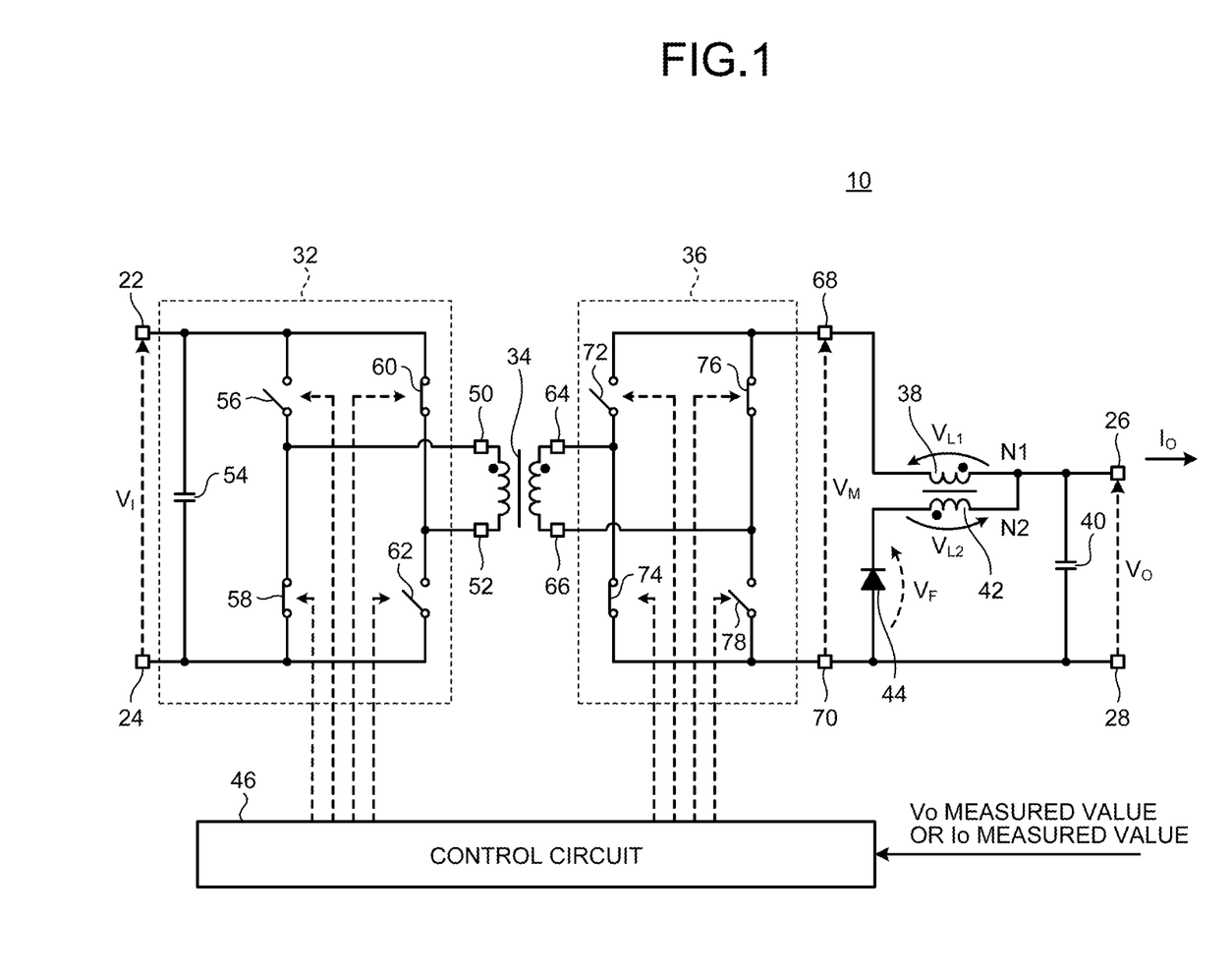
FIG. 1 is a diagram illustrating the configuration of a DC-DC converter according to a first embodiment.

FIG. 1 is a diagram illustrating the configuration of the DC-DC converter 10 according to a first embodiment.

The DC-DC converter 10 is a power conversion device that receives a DC input voltage $V_I$ from a previous-stage device, performs power conversion on the received DC input voltage $V_I$ to a DC output voltage $V_O$, and supplies the output voltage $V_O$ to a subsequent-stage device. According to the present embodiment, the DC-DC converter 10 is of the step-down type. For example, the DC-DC converter 10 outputs the DC output voltage $V_O$ which is obtained by stepping down the DC input voltage $V_I$.

The DC-DC converter 10 is equipped with: a first input terminal 22, a second input terminal 24, a first output terminal 26, a second output terminal 28, a DC-AC conversion circuit 32, a transformer 34, a rectifier circuit 36, a first coil 38, a capacitor 40, a second coil 42, a diode 44, and a control circuit 46.

The DC-DC converter 10 receives the DC input voltage $V_I$ from the previous-stage device between the first input terminal 22 and the second input terminal 24. A voltage higher than the second input terminal 24 is applied to the first input terminal 22. Note that each of the first input terminal 22 and the second input terminal 24 may be a cable or wiring, or the like, that connects to the previous-stage device.

The DC-DC converter 10 outputs a DC output voltage $V_O$ from between the first output terminal 26 and the second output terminal 28 to a subsequent-stage device. The first output terminal 26 generates a voltage higher than the second output terminal 28. Note that each of the first output terminal 26 and the second output terminal 28 may be a cable or wiring, or the like, that connects to the subsequent-stage device.

The DC-AC conversion circuit 32 converts the DC input voltage $V_I$ applied between the first input terminal 22 and the second input terminal 24 into an AC voltage, which is the primary-side AC voltage. Further, the DC-AC conversion circuit 32 outputs the primary-side AC voltage between a first AC terminal 50 and a second AC terminal 52. The waveform of the primary-side AC voltage may be a pulsed waveform.

The DC-AC conversion circuit 32 is, for example, a full bridge-type converter. In the case of a full-bridge type converter, the DC-AC conversion circuit 32 includes a conversion capacitor 54, a first conversion switch 56, a second conversion switch 58, a third conversion switch 60, and a fourth conversion switch 62. The first conversion switch 56, the second conversion switch 58, the third conversion switch 60, and the fourth conversion switch 62 are semiconductor elements such as MOSFETs that switch power lines to conduct or not conduct according to the control from the control circuit 46.

A conversion capacitor 54 is connected between the first input terminal 22 and the second input terminal 24. The first conversion switch 56 is connected between the first input terminal 22 and the first AC terminal 50. The second conversion switch 58 is connected between the first AC terminal 50 and the second input terminal 24. The third conversion switch 60 is connected between the first input terminal 22 and the second AC terminal 52. The fourth conversion switch 62 is connected between the second AC terminal 52 and the second input terminal 24. The first conversion switch 56, the second conversion switch 58, the third conversion switch 60, and the fourth conversion switch 62 have their switching controlled by the control circuit 46 such that a primary-side AC voltage is generated between the first AC terminal 50 and the second AC terminal 52. Accordingly, the DC-AC conversion circuit 32 is capable of converting the DC input voltage $V_I$ to the primary-side AC voltage.

Note that the conversion capacitor 54 may be located outside the input side of the DC-AC conversion circuit 32. Furthermore, the DC-AC conversion circuit 32 may be of the half-bridge type rather than the full-bridge type.

The primary-side coil of the transformer 34 is connected between the first AC terminal 50 and the second AC terminal 52. The transformer 34 generates a secondary-side AC voltage in the secondary-side coil by applying the primary-side AC voltage to the primary-side coil. The secondary-side coil of the transformer 34 is connected between a third AC terminal 64 and a fourth AC terminal 66. Thus, the transformer 34 outputs the secondary-side AC voltage between the third AC terminal 64 and the fourth AC terminal 66. According to the present embodiment, the transformer 34 is of the step-down type.

The rectifier circuit 36 full-wave rectifies the secondary-side AC voltage outputted from the secondary-side coil of the transformer 34. The rectifier circuit 36 then outputs an intermediate voltage $V_M$, which is obtained by full-wave rectifying the secondary-side AC voltage, between a first intermediate terminal 68 and a second intermediate terminal 70.

The rectifier circuit 36 performs full bridge-type, synchronous full-wave rectification, for example. When full bridge-type, synchronous full-wave rectification is performed, the rectifier circuit 36 includes a first rectification switch 72, a second rectification switch 74, a third rectification switch 76, and a fourth rectification switch 78. The first rectification switch 72, the second rectification switch 74, the third rectification switch 76, and the fourth rectification switch 78 are semiconductor elements such as MOSFETs that switch power lines to conduct or not conduct according to the control from the control circuit 46.

The first rectification switch 72 is connected between the third AC terminal 64 and the first intermediate terminal 68. The second rectification switch 74 is connected between the third AC terminal 64 and the second intermediate terminal 70. The third rectification switch 76 is connected between the fourth AC terminal 66 and the first intermediate terminal 68. The fourth rectification switch 78 is connected between the fourth AC terminal 66 and the second intermediate terminal 70.

The first rectification switch 72 and the fourth rectification switch 78 are controlled by the control circuit 46 to turn on during the period when the potential of the third AC terminal 64 is higher than the potential of the fourth AC terminal 66, and to turn off during the period when the potential of the third AC terminal 64 is lower than the potential of the fourth AC terminal 66. The second rectification switch 74 and the third rectification switch 76 are controlled by the control circuit 46 to turn on during the period when the potential of the fourth AC terminal 66 is higher than the potential of the third AC terminal 64, and to turn off during the period when the potential of the fourth AC terminal 66 is lower than the potential of the third AC terminal 64. Accordingly, the rectifier circuit 36 is capable of outputting the intermediate voltage $V_M$, which is obtained by full-wave rectifying the secondary-side AC voltage, between the first intermediate terminal 68 and the second intermediate terminal 70.

Note that the rectifier circuit 36 is not limited to a full bridge-type, synchronous full-wave rectification, and may be full-wave rectified using another type. For example, the rectifier circuit 36 may perform center-tapped, synchronous full-wave rectification, or may perform diode rectification.

The first coil 38 is provided between the first intermediate terminal 68 and the first output terminal 26. In the present embodiment, one terminal of the first coil 38 is connected to the first intermediate terminal 68, and the other terminal is connected to the first output terminal 26.

The capacitor 40 is provided between the first output terminal 26 and the second output terminal 28. According to the present embodiment, one terminal of the capacitor 40 is connected to the first output terminal 26, and the other terminal is connected to the second output terminal 28.

The first coil 38 and the capacitor 40 smooth out the intermediate voltage $V_M$ generated between the first intermediate terminal 68 and the second intermediate terminal 70. Accordingly, the first coil 38 and the capacitor 40 are capable of outputting an output voltage $V_O$, which is obtained by smoothing the intermediate voltage $V_M$, from between the first output terminal 26 and the second output terminal 28. That is, the first coil 38 and the capacitor 40 function as a smoothing circuit.

The second coil 42 is coupled magnetically to the first coil 38. The diode 44 is provided in series with the second coil 42. The diode 44 may also be provided closer to any terminal of the second coil 42. In addition, the second coil 42 and the diode 44, which are provided in series, are subjected to a DC voltage. The DC voltage is applied to the second coil 42 and the diode 44 provided in series, with a polarity in the direction in which a reverse bias is applied to the diode 44. Further, the first coil 38 and the second coil 42 are magnetically coupled such that the current is made flow through the second coil 42 in the forward direction of the diode 44 by mutual induction as the current flowing through the first coil 38 in the direction from the first intermediate terminal 68 to the first output terminal 26 increases.

According to the first embodiment, the second coil 42 has one end connected to the terminal of the first coil 38 on the first output terminal 26 side. Further, in the first embodiment, the first coil 38 and the second coil 42 are magnetically coupled such that the current is made flow through the second coil 42 in the direction from the diode 44 to the first output terminal 26 by mutual induction as the current flowing through the first coil 38 in the direction from the first intermediate terminal 68 to the first output terminal 26 increases. The first coil 38 and the second coil 42 may be a transformer.

In the first embodiment, the diode 44 is provided between the second intermediate terminal 70 and the terminal of the second coil 42 to which the first coil 38 is not connected. Furthermore, in the first embodiment, the diode 44 is provided such that the direction from the second intermediate terminal 70 to the second coil 42 is a forward direction. In the first embodiment, the diode 44 has its anode connected to the second intermediate terminal 70 and its cathode connected to the terminal on the side of the second coil 42 to which the first coil 38 is not connected. The output voltage $V_O$ is applied to the second coil 42 and the diode 44, which are connected in series in this way, as a DC voltage with a polarity in the direction in which the reverse bias is applied to the diode 44.

Note that the diode 44 may also be provided in another position as long as same is provided in series with the second coil 42. For example, the diode 44 may also be connected between the second coil 42 and the first coil 38. In this case, one end of the second coil 42 is connected to the second intermediate terminal 70. The terminal of the second coil 42, which is not connected to the second intermediate terminal 70, is connected to the anode of the diode 44 and not connected to the first coil 38. The cathode of the diode 44 is connected to the first output terminal 26.

The control circuit 46 acquires a measured value for the output voltage $V_O$ outputted between the first output terminal 26 and the second output terminal 28, or a measured value for the output current $I_O$ supplied to the load to which the output voltage $V_O$ is applied. The control circuit 46 calculates the deviation between the measured value for the output voltage $V_O$ and a target voltage, or the deviation between the measured value for the output current $I_O$ and a target current. The control circuit 46 then controls the amount of power for which the input voltage $V_I$ is converted to the output voltage $V_O$, so as to reduce the calculated deviation.

For example, the control circuit 46 controls the switching of the DC-AC conversion circuit 32 to change the amount of power supplied from the DC-AC conversion circuit 32 to the transformer 34 according to the calculated deviation. For example, the control circuit 46 controls the ratio of the on period to the off period in the first conversion switch 56, the second conversion switch 58, the third conversion switch 60, and the fourth conversion switch 62 according to the deviation between the measured value for the output voltage $V_O$ and the target voltage, or the deviation between the measured value for the output current $I_O$ and the target current. For example, the control circuit 46 causes the ON period to be longer when the deviation is negative, and causes the ON period to be shorter when the deviation is positive. Thus, the control circuit 46 is capable of setting the output voltage $V_O$ or the output current $I_O$ as the target value. Note that the DC-DC converter 10 may also be a phase shift converter. In this case, the control circuit 46 controls the phase difference of the switching timing according to the deviation while keeping constant the ratio of the on period to the off period in the first conversion switch 56, the second conversion switch 58, the third conversion switch 60, and the fourth conversion switch 62. Even using this configuration, the control circuit 46 is capable of setting the output voltage $V_O$ or the output current $I_O$ as the target value.

This control circuit 46 includes a central processing unit (CPU), a read-only memory (ROM), and a random-access memory (RAM), for example. The control circuit 46 executes processing on the basis of a program which is set beforehand. For example, the control circuit 46 generates a control signal in co-operation with a processor such as a CPU, for example, and a program (software) stored in the ROM or the like. Note that the function of the control circuit 46 is not limited to being realized using software and may also be implemented using a hardware configuration such as a dedicated circuit.

Note that the DC-DC converter 10 illustrated in FIG. 1 is of the insulated-type. However, the DC-DC converter 10 need not be of the insulated-type and may be a chopper-type converter, as long as same is equipped with a conversion circuit that outputs the intermediate voltage $V_M$, which is obtained by performing power conversion on the input voltage $V_I$, between the first intermediate terminal 68 and the second intermediate terminal 70. When the conversion circuit is of the insulated type, same includes the DC-AC conversion circuit 32, the transformer 34, and the rectifier circuit 36. When the conversion circuit is of the chopper type, same includes a switch such as a MOSFET, and a diode.

In the foregoing DC-DC converter 10, the second coil 42 and the diode 44 function as a regenerative snubber circuit that suppresses the intermediate voltage $V_M$ generated between the first intermediate terminal 68 and the second intermediate terminal 70 to equal to or smaller than the clamp voltage $V_{clamp}$, and that regenerates the suppressed power as power to be outputted. More specifically, the second coil 42 and the diode 44 operate as follows.

First, when the intermediate voltage $V_M$ is greater than the output voltage $V_O$, the first coil 38 generates the first coil voltage $V_{L1}$. At this time, the first coil 38 has a low potential on the first output terminal 26 side and a high potential on the first intermediate terminal 68 side.

When the first coil 38 generates the first coil voltage $V_{L1}$, the second coil 42 generates the second coil voltage $V_{L2}$ by mutual induction. Note that the second coil 42 is magnetically coupled to the first coil 38 such that, when the current flowing through the first coil 38 in the direction from the first intermediate terminal 68 to the first output terminal 26 increases, the current flows through the forward direction of the diode 44. Here, the second coil voltage $V_{L2}$ is positive in the direction from the diode 44 to the first output terminal 26.

The second coil 42 is connected in series with the diode 44. Therefore, when the voltage ($V_F+V_{L2}$), which is obtained by adding together the forward voltage $V_F$ of the diode 44 and the second coil voltage $V_{L2}$, is lower than the output voltage $V_O$, a reverse bias is applied to the diode 44, and hence the diode 44 is turned off. Therefore, when the voltage ($V_F+V_{L2}$), which is obtained by adding together the forward voltage $V_F$ of the diode 44 and the second coil voltage $V_{L2}$, is lower than the output voltage $V_O$, no current flows through the second coil 42 or the diode 44.

In contrast, when the voltage ($V_F+V_{L2}$), which is obtained by adding together the forward voltage $V_F$ of the diode 44 and the second coil voltage $V_{L2}$, matches the output voltage $V_O$, a forward bias is applied to the diode 44, and hence the diode 44 is turned on. Therefore, when the voltage ($V_F$+$V_{L2}$), which is obtained by adding together the forward voltage $V_F$ of the diode 44 and the second coil voltage $V_{L2}$, matches the output voltage $V_O$, the second coil 42 and the diode 44 conduct current in the forward direction of the diode 44.

An output voltage $V_O$, which is a DC voltage, is applied to the diode 44 and the second coil 42. Therefore, the voltage ($V_F$+$V_{L2}$), which is obtained by adding together the forward voltage $V_F$ of the diode 44 and the second coil voltage $V_{L2}$, does not become larger than the output voltage $V_O$. Therefore, the second coil voltage $V_{L2}$ will not be greater than the differential voltage ($V_O$-$V_F$) obtained by subtracting the forward voltage $V_F$ from the output voltage $V_O$.

Furthermore, the voltage ratio between the first coil voltage $V_{L1}$ and the second coil voltage $V_{L2}$ is fixed by means of the winding ratio. Therefore, the first coil voltage $V_{L1}$ will not be larger than the voltage determined by the differential voltage ($V_O$-$V_F$) and the winding ratio. In other words, the first coil voltage $V_{L1}$ will not be greater than the voltage determined by the winding ratio and the output voltage $V_O$.

The intermediate voltage $V_M$ is the voltage obtained by adding together the output voltage $V_O$ and the first coil voltage $V_{L1}$. Therefore, if the first coil voltage $V_{L1}$ is suppressed to a predetermined voltage, the intermediate voltage $V_M$ will also be suppressed in a coordinated manner. As a result, the intermediate voltage $V_M$ between the first intermediate terminal 68 and the second intermediate terminal 70 is suppressed so as not to be equal to or greater than the voltage determined by the winding ratio and the output voltage $V_O$.

Figure 2:
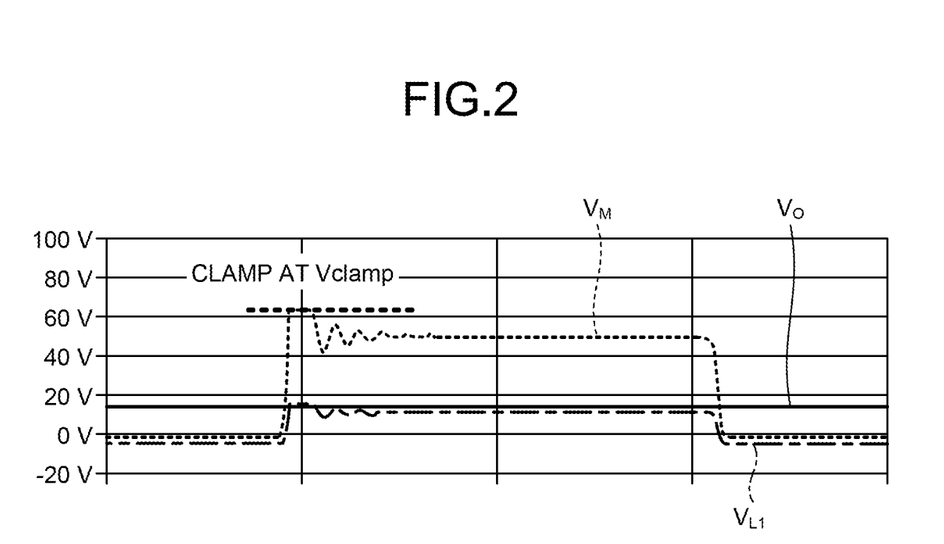
FIG. 2 is a diagram illustrating an example of waveforms of an output voltage, a first coil voltage, and an intermediate voltage.

Note that power due to surges working in the direction in which the intermediate voltage $V_M$ is increased is sometimes supplied between the first intermediate terminal 68 and the second intermediate terminal 70 due to the effect of the leakage inductance of the transformer 34 and so forth. In this case, the DC-DC converter 10 suppresses an increase in the intermediate voltage $V_M$ by causing a current corresponding to the power caused by a surge to flow through the second coil 42. Furthermore, according to the first embodiment, the capacitor 40 is charged by the current flowing through the second coil 42. Due to this configuration, according to the first embodiment, the DC-DC converter 10 is capable of causing the current generated by the surge to be regenerated as the output current $I_O$. FIG. 2 is a diagram illustrating an example of waveforms of the output voltage $V_O$, the intermediate voltage $V_M$, and the first coil voltage $V_{L1}$.

The output voltage $V_O$ is the voltage obtained by smoothing the intermediate voltage $V_M$ by means of the first coil 38 and the capacitor 40, and is stabilized to a constant voltage. In the example of FIG. 2, the output voltage $V_O$ is constant at on the order of 18 volts.

The intermediate voltage $V_M$ is a full-wave rectified voltage waveform of a pulsed waveform, and ringing occurs at the rising edge. The first coil voltage $V_{L1}$ has a voltage waveform that is synchronized with the intermediate voltage $V_M$.

The intermediate voltage $V_M$ is then clamped at the clamp voltage $V_{clamp}$, which is determined according to the output voltage $V_O$. In the example of FIG. 2, the intermediate voltage $V_M$ is clamped at approximately 60 volts. In this way, the DC-DC converter 10 is capable of suppressing the surge voltage contained in the intermediate voltage $V_M$.

Here, the clamp voltage $V_{clamp}$ is determined on the basis of the following equation (1).

$$V_{clamp}=N\times(V_O-V_F) \quad (1)$$

In equation (1), $V_F$ is the forward voltage of the diode 44 and is a fixed value. N is the winding ratio of the first coil 38 to the second coil 42. If the number of windings of the first coil 38 is N1 and the number of windings of the second coil 42 is N2, then N=(N1/N2).

As illustrated in equation (1), according to the first embodiment, the clamp voltage $V_{clamp}$ is determined by the winding ratio and the output voltage $V_O$. Therefore, according to the first embodiment, the DC-DC converter 10 is capable of suppressing the intermediate voltage $V_M$ so as not to be equal to or greater than the voltage determined by the winding ratio and the output voltage $V_O$.

As described above, the DC-DC converter 10 according to the present embodiment is capable of efficiently suppressing the surge voltage generated on the secondary side of the transformer 34.

Figure 3:
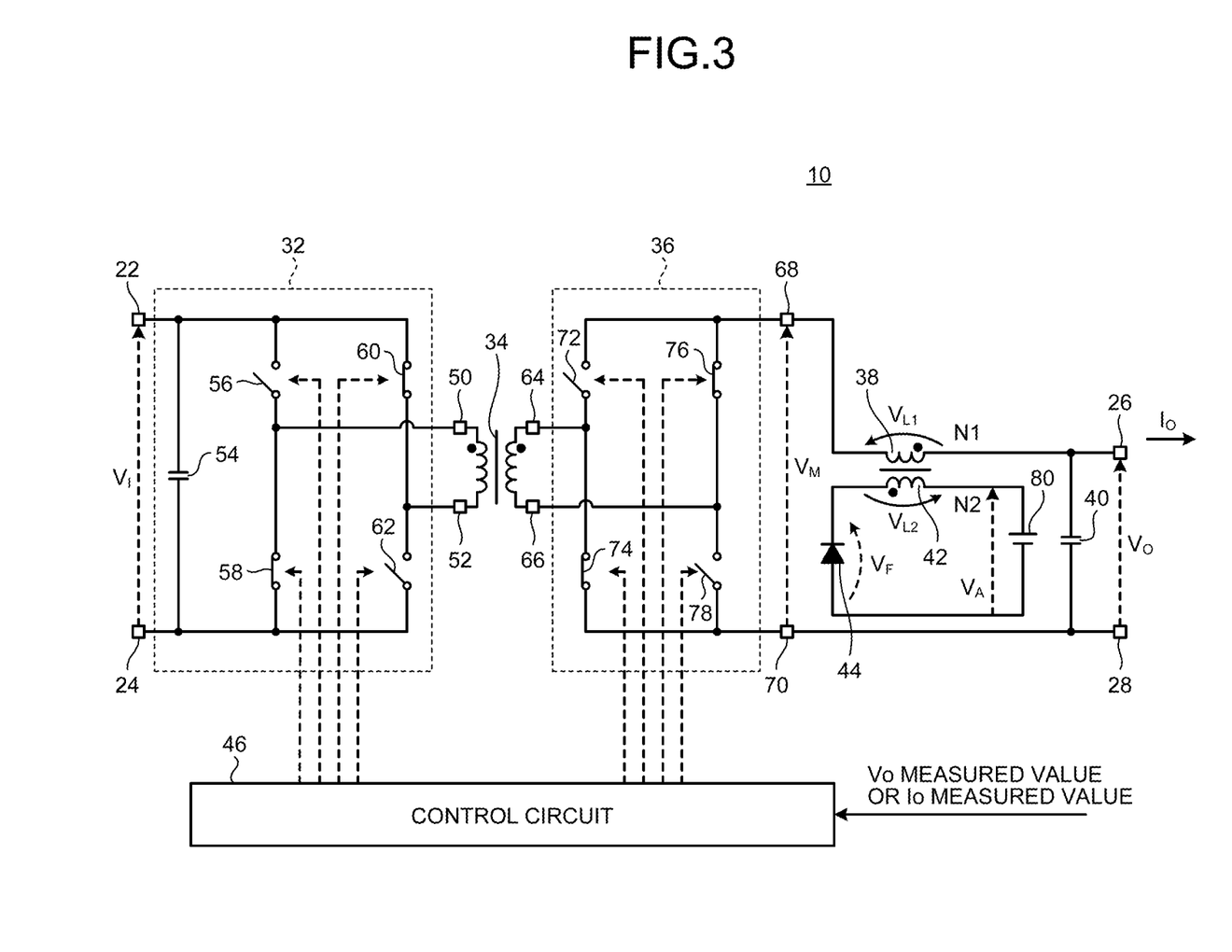
FIG. 3 is a diagram illustrating the configuration of a DC-DC converter according to a second embodiment.

FIG. 3 is a diagram illustrating the configuration of the DC-DC converter 10 according to a second embodiment. The DC-DC converter 10 according to the second embodiment has substantially the same functions and configuration as those of the first embodiment. In the description of the fourth embodiment, circuits with substantially the same functions and configuration as those of the first embodiment are given the same reference signs, and details are omitted except for differences.

The DC-DC converter 10 according to the second embodiment is further equipped with a DC voltage generation unit 80. The DC voltage generation unit 80 may also be provided outside the DC-DC converter 10. The DC voltage generation unit 80 generates an external voltage $V_A$, which is a DC voltage. The DC voltage generation unit 80 is, for example, a secondary battery and supplies power to devices other than the DC-DC converter 10.

According to the second embodiment, an external voltage $V_A$, which is generated by the DC voltage generation unit 80 instead of the output voltage $V_O$, is applied to the second coil 42 and the diode 44, which are provided in series, as the DC voltage with a polarity in the direction in which a reverse bias is applied to the diode 44.

According to the second embodiment, the diode 44 has its anode connected to the negative terminal of the DC voltage generation unit 80 and its cathode connected to one end of the second coil 42. Furthermore according to the second embodiment, the terminal of the second coil 42 to which the diode 44 is not connected is connected to the positive terminal of the DC voltage generation unit 80 and is not connected to the first coil 38. The external voltage $V_A$ is applied to the second coil 42 and the diode 44, which are connected in series in this way, as a DC voltage with a polarity in the direction in which the reverse bias is applied to the diode 44.

Instead of this connection, the second coil 42 may also have one end connected to the negative terminal of the DC voltage generation unit 80. In this case, the second coil 42 is not connected to the first coil 38. Furthermore, the diode 44 has its anode connected to the terminal of the second coil 42, which is not connected to the DC voltage generation unit 80, and its cathode connected to the positive terminal of the DC voltage generation unit 80. Even with this connection, the external voltage $V_A$ is applied to the second coil 42 and the diode 44, which are connected in series, as a DC voltage with a polarity in the direction in which the reverse bias is applied to the diode 44.

In the DC-DC converter 10 with this configuration, the second coil 42 and the diode 44 function as a regenerative snubber circuit that suppresses the intermediate voltage $V_M$ to equal to or smaller than the clamp voltage $V_{clamp}$, and causes the DC voltage generation unit 80 to regenerate the suppressed power. The regenerative snubber function of the DC-DC converter 10 according to the second embodiment operates by replacing the output voltage $V_O$ according to the first embodiment with an external voltage $V_A$.

Further, according to the second embodiment, the clamp voltage $V_{clamp}$ is determined on the basis of the following equation (2).

$$V_{clamp}=N\times(V_A-V_F) \qquad (2)$$

Therefore, in the DC-DC converter 10 according to the second embodiment, the intermediate voltage $V_M$ is suppressed so as not to be equal to or greater than the voltage determined by the winding ratio and the external voltage $V_A$. However, according to the second embodiment, the current flowing through the second coil 42 is supplied to the DC voltage generation unit 80 instead of the capacitor 40. Therefore, according to the second embodiment, the DC-DC converter 10 is capable of causing the DC voltage generation unit 80 to regenerate the current generated by the surge.

Figure 4:
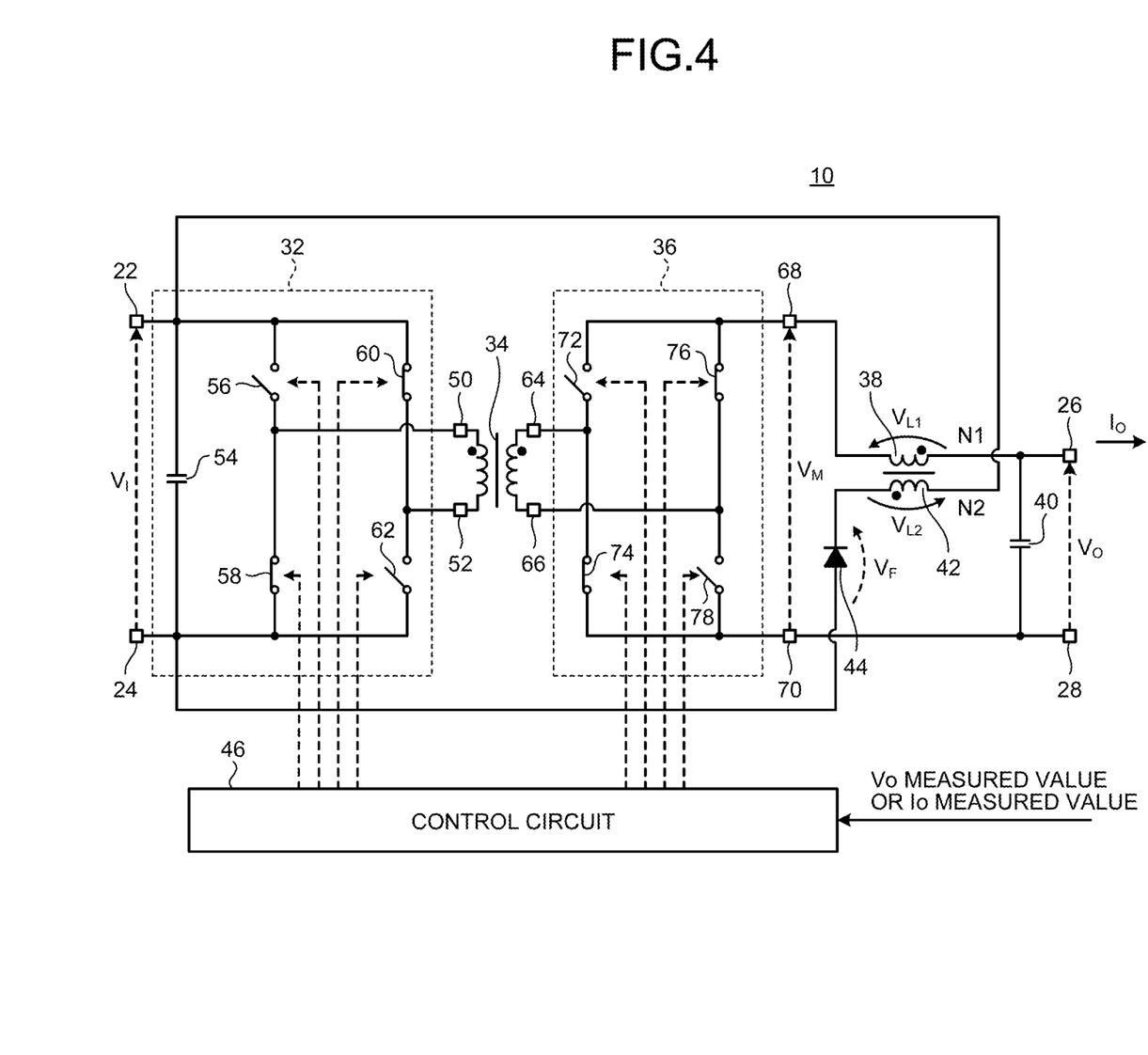
FIG. 4 is a diagram illustrating the configuration of a DC-DC converter according to a third embodiment.

FIG. 4 is a diagram illustrating the configuration of the DC-DC converter 10 according to a third embodiment. The DC-DC converter 10 according to the third embodiment has substantially the same functions and configuration as those of the first embodiment. In the description of the fourth embodiment, circuits with substantially the same functions and configuration as those of the first embodiment are given the same reference signs, and details are omitted except for differences.

According to the third embodiment, The input voltage $V_I$, which is supplied between the first input terminal 22 and the second input terminal 24, is applied to the second coil 42 and the diode 44, which are provided in series, instead of the output voltage $V_O$, as a DC voltage with a polarity in the direction in which a reverse bias is applied to the diode 44.

According to the third embodiment, the diode 44 has its anode connected to the second input terminal 24 without being connected to the second intermediate terminal 70, and its cathode connected to one end of the second coil 42. Furthermore, according to the third embodiment, the terminal of the second coil 42, to which the diode 44 is not connected, is connected to the first input terminal 22 and is not connected to the first coil 38. The input voltage $V_I$ is applied to the second coil 42 and the diode 44, which are connected in series in this way, as a DC voltage with a polarity in the direction in which the reverse bias is applied to the diode 44.

Instead of such a connection, the second coil 42 may also have one end connected to the second input terminal 24. In this case, the diode 44 has an anode connected to the terminal of the second coil 42, which is not connected to the second input terminal 24, and a cathode connected to the first input terminal 22. Even with this connection, The input voltage $V_I$ is applied to the second coil 42 and the diode 44, which are connected in series, as a DC voltage with a polarity in the direction in which the reverse bias is applied to the diode 44.

In the DC-DC converter 10 with this configuration, the second coil 42 and the diode 44 function as a regenerative snubber circuit that suppresses the intermediate voltage $V_M$ to equal to or smaller than the clamp voltage $V_{clamp}$, and causes the conversion capacitor 54 to regenerate the suppressed power. The regenerative snubber function of the DC-DC converter 10 according to the third embodiment operates by replacing the output voltage $V_O$ according to the first embodiment with the input voltage $V_I$.

Further, according to the third embodiment, the clamp voltage $V_{clamp}$ is determined on the basis of the following equation (3).

$$V_{clamp}=N\times(V_I-V_F) \qquad (3)$$

Therefore, in the DC-DC converter 10 according to the third embodiment, the intermediate voltage $V_M$ is suppressed so as not to be equal to or greater than the voltage determined by the winding ratio and the input voltage $V_I$. However, according to the third embodiment, the current flowing through the second coil 42 is supplied to the conversion capacitor 54 instead of the capacitor 40. Therefore, according to the third embodiment, the DC-DC converter 10 is capable of regenerating the current generated by the surge as the input voltage $V_I$.

Figure 5:
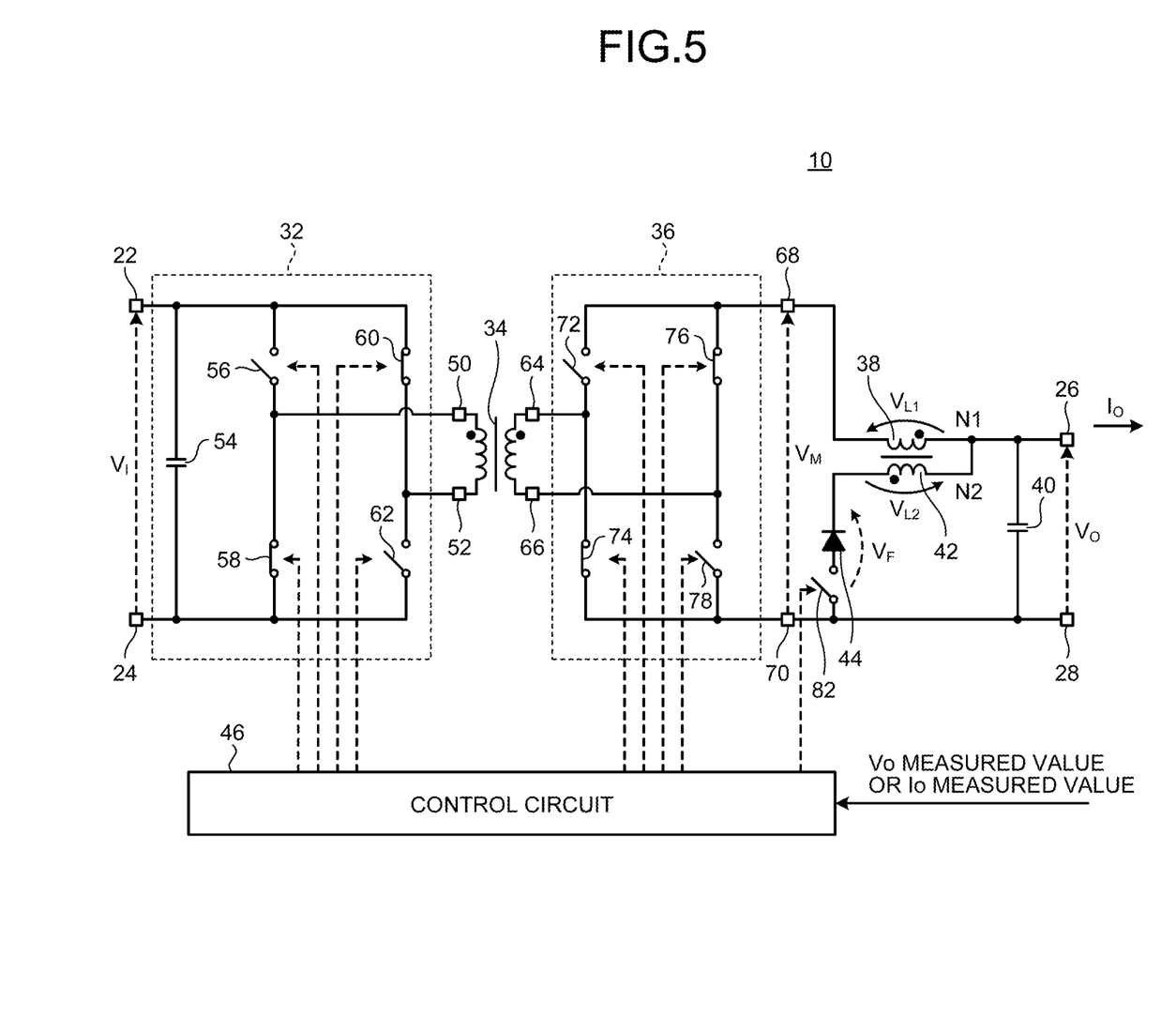
FIG. 5 is a diagram illustrating the configuration of a DC-DC converter according to a fourth embodiment.

FIG. 5 is a diagram illustrating the configuration of the DC-DC converter 10 according to a fourth embodiment. The DC-DC converter 10 according to the fourth embodiment has substantially the same functions and configuration as those of the first embodiment. In the description of the fourth embodiment, circuits with substantially the same functions and configuration as those of the first embodiment are given the same reference signs, and details are omitted except for differences.

The DC-DC converter 10 according to the fourth embodiment is further equipped with an enable switch 82. The enable switch 82 switches whether to allow current to flow through the second coil 42. For example, the enable switch 82 is provided in series with the second coil 42 and the diode 44. For example, the enable switch 82 may be provided between the anode of the diode 44 and the second intermediate terminal 70, provided between the diode 44 and the second coil 42, or provided between the second coil 42 and the first output terminal 26.

The enable switch 82 is switched by the control circuit 46 so as to allow current to flow through the second coil 42 when the output voltage $V_O$, which is the DC voltage applied to the second coil 42 and the diode 44 connected in series, is within a predetermined set voltage range, and so as not to allow current to flow through the second coil 42 when the output voltage $V_O$ is outside the set voltage range. For example, the control circuit 46 acquires the set value for the output voltage $V_O$. The control circuit 46 then turns on the enable switch 82 when the measured value for the output voltage $V_O$ is within the set voltage range, and turns off the enable switch 82 when the measured value for the output voltage $V_O$ is outside the set voltage range.

Thus, the DC-DC converter 10 is capable of enabling a clamp function when the output voltage $V_O$ is within the set voltage range, and of disabling the clamp function when the output voltage $V_O$ is outside the set voltage range.

The output voltage $V_O$ sometimes varies depending on, for example, the state of the load or the type of load connected, and so forth. The clamp voltage $V_{clamp}$ varies according to the output voltage $V_O$. Depending on the output voltage $V_O$, the clamp voltage $V_{clamp}$ may end up being significantly larger than the surge voltage generated, or may be close to the steady state intermediate voltage $V_M$. In such a case, the DC-DC converter 10 is incapable of suitably suppressing the surge voltage. By being further equipped with the enable switch 82, the DC-DC converter 10 according to the fourth embodiment is capable of enabling the clamp function when the output voltage $V_O$ is within the set voltage range, and hence is capable of suitably suppressing the surge voltage.

Note that the enable switch 82 may be provided to the DC-DC converter 10 according to the second embodiment or third embodiment. When provided to the DC-DC converter 10 according to the second embodiment, the enable switch 82 is switched by the control circuit 46 so that current flows through the second coil 42 when the external voltage $V_A$ is within a predetermined set voltage range, and so that no current flows through the second coil 42 when the external voltage $V_A$ is outside the set voltage range. Accordingly, even when the external voltage $V_A$ varies, the surge voltage can be suitably suppressed. Furthermore, when provided to the DC-DC converter 10 according to the third embodiment, the enable switch 82 is switched by the control circuit 46 so that current flows through the second coil 42 when the input voltage $V_I$ is within a predetermined set voltage range, and so that no current flows through the second coil 42 when the input voltage $V_I$ is outside the set voltage range. Accordingly, even when the input voltage $V_I$ varies, the clamp function is enabled, and the surge voltage can be suitably suppressed.

Furthermore, the enable switch 82 may be switched by the control circuit 46 so that current flows through the second coil 42 when the intermediate voltage $V_M$ is within a predetermined set voltage range, and so that current does not flow through the second coil 42 when the output voltage $V_O$ is outside the set voltage range. Thus, the DC-DC converter 10 is capable of enabling the clamp function and suppressing the surge voltage when the intermediate voltage $V_M$ is likely to exceed the clamp voltage $V_{clamp}$, for example. Cases where the enable switch 82 is provided to the second embodiment or third embodiment are also similar.

Figure 6:
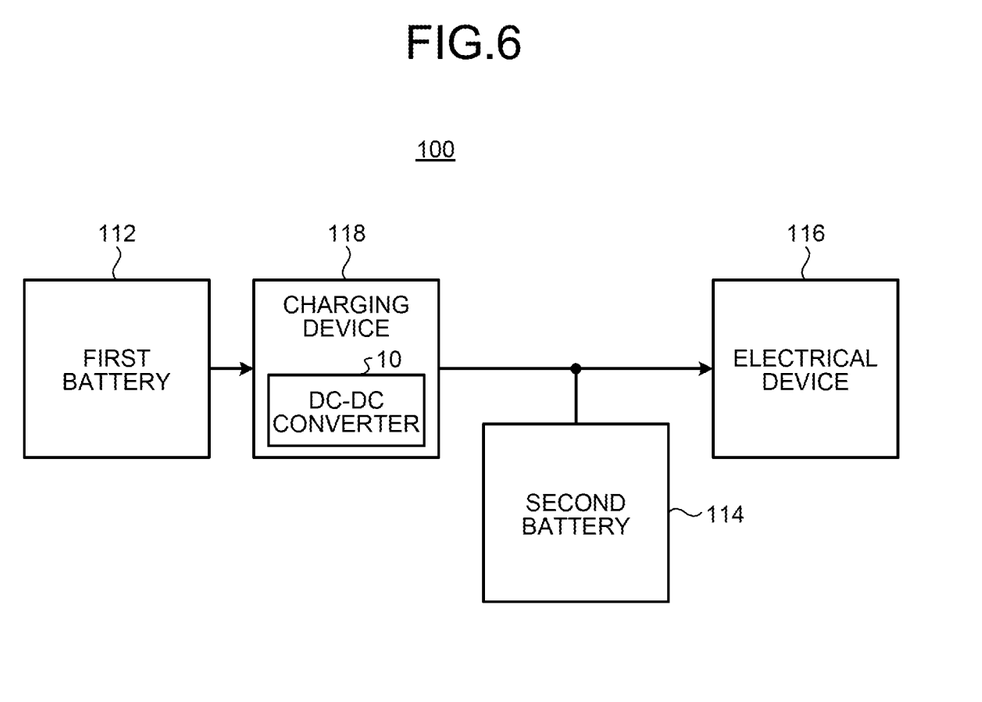
FIG. 6 is a diagram illustrating the configuration of a vehicle according to a fifth embodiment.

FIG. 6 is a diagram illustrating the configuration of a vehicle 100 according to a fifth embodiment. The vehicle 100 is equipped with a first battery 112, a second battery 114, an electrical device 116, and a charging device 118.

The first battery 112 is a lithium-ion battery, for example, and is supplied with power from a charging station for electric vehicles, or the like. The first battery 112 generates a DC voltage on the order of 360 V, for example.

The second battery 114 is a lead-acid battery, for example, to which the power of the first battery 112 is transferred and charged. The second battery 114 generates a DC voltage on the order of 12 V, for example.

The electrical device 116 is a device mounted in the vehicle 100. The electrical device 116 is operated by the power outputted from the charging device 118 or the power with which the second battery 114 is charged. For example, the electrical device 116 is an onboard computer, power steering, headlights, and an air conditioner.

The charging device 118 includes the DC-DC converter 10 according to any of the first to fourth embodiments. The charging device 118 takes the power from the first battery 112 and charges the second battery 114. For example, the DC-DC converter 10 included in the charging device 118 steps down the DC voltage generated by the first battery 112 and converts same into a DC voltage enabling charging of the second battery 114.

The vehicle 100 is able to travel by driving the motor with the power of the first battery 112. In addition, the vehicle 100 is capable of driving the electrical device 116 with the power of the second battery 114 to perform various control and auxiliary operations of the vehicle 100.

The vehicle 100 is then capable of efficiently suppressing the internally generated surge voltage in the DC-DC converter 10 in the charging device 118. The vehicle 100 is thus capable of efficiently charging the second battery 114 with the power of the first battery 112.

Furthermore, all of the embodiments described above are merely concrete examples when carrying out the present disclosure, and should not be construed as limiting the technical scope of the present disclosure. In other words, the present disclosure can be implemented in various forms without deviating from the spirit or the main characteristics thereof.

The DC-DC converter and the vehicle according to the present disclosure are capable of efficiently suppressing a surge voltage.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter that outputs a DC output voltage between a first output terminal and a second output terminal by performing power conversion on a DC input voltage, the DC-DC converter comprising:
    a conversion circuit that outputs an intermediate voltage which is obtained by performing power conversion on the input voltage, between a first intermediate terminal and a second intermediate terminal;
    a first coil provided between the first intermediate terminal and the first output terminal;
    a second coil; and
    a diode provided in series with the second coil, wherein
    the DC output voltage is applied to the second coil and the diode provided in series, with a polarity in a direction in which a reverse bias is applied to the diode, and
    the first coil and the second coil are magnetically coupled such that a current is made flow through the second coil in a forward direction of the diode by mutual induction as a current flowing through the first coil in a direction from the first intermediate terminal to the first output terminal increases.

2. The DC-DC converter according to claim 1, further comprising a capacitor that is provided between the first output terminal and the second output terminal.

3. The DC-DC converter according to claim 1, wherein
    the second coil has one end connected to a terminal of the first coil, the terminal of the first coil being closer to the first output terminal,
    the diode is provided between the second intermediate terminal and a terminal of the second coil, the first coil being not connected to the terminal of the second coil, such that a direction from the second intermediate terminal to the second coil is a forward direction, and
    the first coil and the second coil are magnetically coupled such that a current is made flow through the second coil in a direction from the diode to the first output terminal by mutual induction as the current flowing through the first coil in the direction from the first intermediate terminal to the first output terminal increases.

4. The DC-DC converter according to claim 1, wherein the conversion circuit includes:

a DC-AC conversion circuit that converts the input voltage to a primary-side AC voltage;

a transformer that converts the primary-side AC voltage to a secondary-side AC voltage; and a rectifier circuit that outputs the intermediate voltage which is obtained by full-wave rectifying the secondary-side AC voltage, between the first intermediate terminal and the second intermediate terminal.

5. The DC-DC converter according to claim 1, wherein the DC-DC converter is of a step-down type.

6. The DC-DC converter according to claim 1, further comprising an enable switch that switches whether to allow a current to flow through the second coil, wherein the enable switch is switched so as to allow a current to flow through the second coil when the DC output voltage is within a predetermined set voltage range, and so as not to allow a current to flow through the second coil when the DC output voltage is outside the set voltage range.

7. The DC-DC converter according to claim 1, further comprising a control circuit that controls an amount of power for which the input voltage is converted to the output voltage, according to a measured value obtained by measuring the output voltage or a measured value for an output current supplied to a load.

8. A vehicle that includes the DC-DC converter according to claim 1.

9. A DC-DC converter that outputs a DC output voltage between a first output terminal and a second output terminal by performing power conversion on a DC input voltage, the DC-DC converter comprising:

a conversion circuit that outputs an intermediate voltage which is obtained by performing power conversion on the input voltage, between a first intermediate terminal and a second intermediate terminal;

a first coil provided between the first intermediate terminal and the first output terminal;

a second coil; and a diode provided in series with the second coil, wherein an external DC voltage generated by a DC voltage generation unit is applied to the second coil and the diode provided in series, the external DC voltage generated by the DC voltage generation unit is applied to the second coil and the diode provided in series, with a polarity in a direction in which a reverse bias is applied to the diode, and the first coil and the second coil are magnetically coupled such that a current is made flow through the second coil in a forward direction of the diode by mutual induction as a current flowing through the first coil in a direction from the first intermediate terminal to the first output terminal increases.

10. The DC-DC converter according to claim 9, further comprising a capacitor that is provided between the first output terminal and the second output terminal.

11. The DC-DC converter according to claim 9, wherein the conversion circuit includes:

a DC-AC conversion circuit that converts the input voltage to a primary-side AC voltage;

a transformer that converts the primary-side AC voltage to a secondary-side AC voltage; and a rectifier circuit that outputs the intermediate voltage which is obtained by full-wave rectifying the secondary-side AC voltage, between the first intermediate terminal and the second intermediate terminal.

12. The DC-DC converter according to claim 11, wherein the DC-DC converter is of a step-down type.

13. The DC-DC converter according to claim 9, further comprising an enable switch that switches whether to allow a current to flow through the second coil, wherein the enable switch is switched so as to allow a current to flow through the second coil when the DC output voltage is within a predetermined set voltage range, and so as not to allow a current to flow through the second coil when the DC output voltage is outside the set voltage range.

14. The DC-DC converter according to claim 9, further comprising a control circuit that controls an amount of power for which the input voltage is converted to the output voltage, according to a measured value obtained by measuring the output voltage or a measured value for an output current supplied to a load.

15. A vehicle that includes the DC-DC converter according to claim 9.

\* \* \* \* \*